United States Patent [19]

Kistner

[11] Patent Number: 5,051,144
[45] Date of Patent: Sep. 24, 1991

[54] METHOD FOR ENCASING A POROUS BODY IN AN ENVELOPE OF PLASTIC MATERIAL

[75] Inventor: David R. Kistner, Troy, Mich.

[73] Assignee: Sota Technology, Inc., Troy, Mich.

[21] Appl. No.: 426,323

[22] Filed: Oct. 24, 1989

Related U.S. Application Data

[63] Continuation-in-part of Ser. No. 197,595, May 23, 1988, Pat. No. 4,880,680.

[51] Int. Cl.$^5$ .............................................. B32B 31/26
[52] U.S. Cl. ..................................... 156/85; 156/213; 156/285; 428/71; 428/74; 428/76
[58] Field of Search ............... 156/212, 213, 285, 286, 156/382, 85; 428/74, 76, 71

[56] References Cited

U.S. PATENT DOCUMENTS

| | | | |
|---|---|---|---|
| 3,589,967 | 6/1971 | Shirakawa | 156/287 |
| 3,863,758 | 2/1975 | Connelly | 428/74 X |
| 4,485,590 | 12/1984 | Legg et al. | 428/76 |
| 4,671,979 | 6/1987 | Adiletta | 428/74 |
| 4,675,225 | 6/1987 | Cutler | 428/74 |

Primary Examiner—Robert A. Dawson
Attorney, Agent, or Firm—Charles W. Chandler

[57] ABSTRACT

A method for encasing a porous body, such as fiberglass, in an envelope of a plastic sheet material in which the plastic material is embedded in the fiberglass without the use of an adhesive material other than the plastic sheet material.

28 Claims, 5 Drawing Sheets

METHOD FOR ENCASING A POROUS BODY IN AN ENVELOPE OF PLASTIC MATERIAL

Cross-Reference to Related Application

This application is a continuation-in-part of application Ser. No. 197,595, filed May 23, 1988 and now U.S. Pat. No. 4,880,680 for AN ARTICLE OF MANUFACTURE AND METHOD FOR ENCASING SAME.

Background of the Invention

This invention is related to a method for encasing an article, such as a fiberglass mat, in an envelope of plastic sheet material.

Fiberglass mats are used as a deadening material in automobiles, and as insulation in a variety of products. This material has a tendency to break down, when being handled by manufacturing personnel, causing the skin of the user to itch.

Vacuum-forming techniques have been disclosed in the upholstering art in which an expandable plastic film is placed over one side of a cushioning material mounted on a frame, and then a controlled vacuum is applied to tightly draw the film against the frame. One such process has been disclosed in U.S. Pat. No. 3,589,967 which issued Jun. 29, 1971 to Katsuya Shirakawa. In this process, the film is heated as it is being drawn by the vacuum to make the film pliable so that it conforms to the contour of the cushioning material. It is believed that this process is unsuitable for encasing a compressible material, such as fiberglass, in a thin plastic envelope because of the tendency of the film to tear when not properly processed.

U.S. Pat. No. 4,485,590 which issued Dec. 4, 1984 to Westley E. Legg, et al. for a "Door and Frame Molded of Fibrous Mineral Material" discloses a core formed of an impregnated glass wool. The core is dipped or brushed with a resin to produce a reinforced skin adjacent the outer surfaces of the core. This product does not employ a vacuum forming process in which the plastic film is heated for embedding in the outer surface of the core.

U.S. Pat. No. 4,675,225 which issued Jun. 23, 1987 to William P. Cutler for a "Thermal Insulating Blanket" discloses an insulating blanket in which a fiberglass inner layer is contained within an envelope of a flexible material. However, there is no suggestion of adhering the envelope to the entire surface of the inner fiberglass layer.

Further Cutler suggests the use of an adhesive for attaching the envelope to the inner core.

U.S. Pat. No. 4,671,979 which issued Jun. 9, 1987 to Joseph G. Adiletta for an "Insulating Structure" teaches of containing woven fiberglass in an envelope of impervious material with heat sealed edges, but there is no teaching of attaching either of the envelope sheets to the inner layer of fiberglass.

U.S. Pat. No. 3,863,758 which issued Feb. 4, 1975 to Frank J. Connelly discloses a thermoplastic envelope of a pulverulent thermoplastic polymer. The envelope holds the polymer constituents together because of their powdery tendency.

U.S. Pat. No. 4,740,417 which issued Apr. 26, 1988 to Roger Tornero; U.S. Pat. No. 4,737,226 which issued Apr. 12, 1988 to Hirofumi Inoue; U.S. Pat. No. 4,692,199 which issued Sept. 8, 1987 to Eric F. Kozlowski, et al.; U.S. Pat. No. 4,664,738 which issued May 12, 1987 to Safwat E. Tadros; and, U.S. Pat. No. 4,104,430 which issued Aug. 1, 1978 to Sidney D. Fenton, generally relate to vacuum-forming and heating of plastic sheets for attachment to a porous product. None suggest a method for fully encapsulating a fiberglass product with a film that is also attached to the enclosed fiberglass.

U.S. Pat. No. 4,082,882 which issued Apr. 4, 1978 to Hyman Weinstein and Kurt Adler for a "Fiberglass Reinforced Plywood Structural Sandwich With Acrylic Facing On One Or Both Sides Thereof" teaches of a sandwich material formed by a vacuum-forming process with plastic sheets integrated as a bonded composite using a resin.

U.S. Pat. No. 4,824,507 issued Apr. 25, 1989 to John A. D'Amico for a "Process To Produce Enveloped Fiberglass Product". The D'Amico reference discloses a molded fiberglass product totally enclosed in an envelope in a process that employs an adhesive to attach the envelope material to the fiberglass mat.

U.S. Pat. No. 3,382,125 which issued May 7, 1968 to A. J. Lowdermilk, Jr. discloses a process for vulcanizing floor mats in which a vacuum is applied to opposite sides of a layer of cushioning material. A polyethylene sheet film is heated sufficiently to adhere to one side of the internal layer. The polyethylene material functions as an adhesive for attaching the inner cushioning layer to a rubber mat blank.

Summary of the Invention

The broad purpose of the present invention is to provide an improved method for encasing a porous mat in an envelope of a plastic film. The porous mat may be of a molded or a woven fiberglass, or a composite material such as fiberglass adhered to a porous foam material.

Preferably the envelope is formed of two sheets having their edges heat-sealed around the periphery of the mat. Each sheet is embedded in the surface of the porous mat.

The preferred method, which will be described in greater detail, comprises placing a fiberglass mat on a metal base which may be preheated. The base forms the top wall of a vacuum chamber connected to a vacuum pump. The mat can take any of a variety of configurations.

The base has a vertical sidewall that extends around the mat. A sheet of air-impervious, polyethylene plastic material is mounted on the sidewall, above the mat. The plastic sheet forms the top wall of an air-tight chamber for the mat. The sheet, base and mat are placed beneath a radiant heater which heats the sheet until it becomes adhesive. The vacuum pump then lowers the pressure beneath the sheet, drawing it toward the base to intimately engage the mat. The heated sheet becomes embedded in and adheres to the surface of the fiberglass mat. The sheet is then cooled to take a set conforming to the configuration of one side of the mat.

The sheet is trimmed to form a continuous lip around the mat. The sheet is perforated with a pattern of small openings if the mat is a loosely woven material. Perforations are unnecessary if the mat is a rigid molded product, because the sheet becomes somewhat porous when heated in contact with the mat. The sheet and the mat are then turned upside-down. A second plastic sheet is suspended above the mat and heated. A vacuum is applied beneath the second sheet which adheres to the opposite side of the mat and the trimmed edge of the first sheet. The second sheet is also cooled and trimmed to form a finished article in which the compressed mat is encased between the two sheets.

In another form of the invention, the mat is placed between two plastic sheets to form an envelope. The sheets are heat-sealed together around the edge of the mat. The heat sealed edges are simultaneously trimmed close to the mat edge. The sheets are then heated and the air exhausted from the envelope. The molten sheets become embedded in the mat surface as the envelope shrinks and cools.

Still further objects and advantages of the invention will become readily apparent to those skilled in the art to which the invention pertains upon reference to the following detailed description.

Description of the Drawings

The description refers to the accompanying drawings in which like reference characters refer to like parts throughout the several views, and in which.

Description of the Preferred Embodiment

Figure 1:
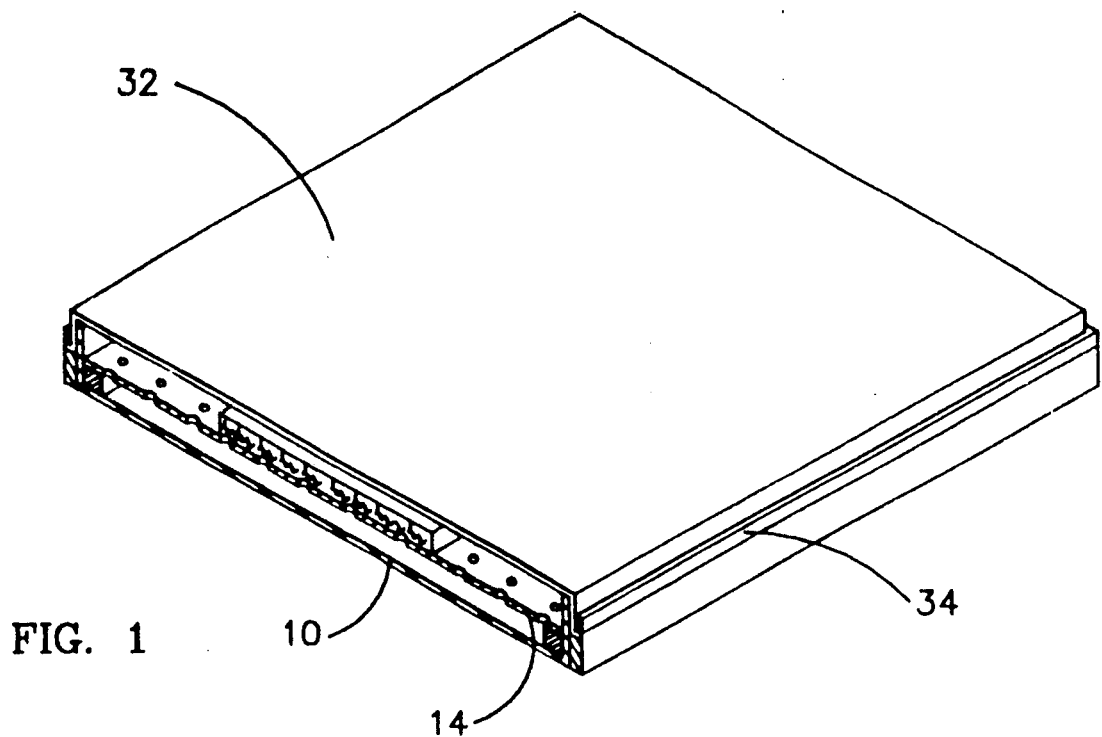
FIG. 1 illustrates the initial step for encasing a fiberglass mat in accordance with the preferred embodiment of the invention.
Figure 2:
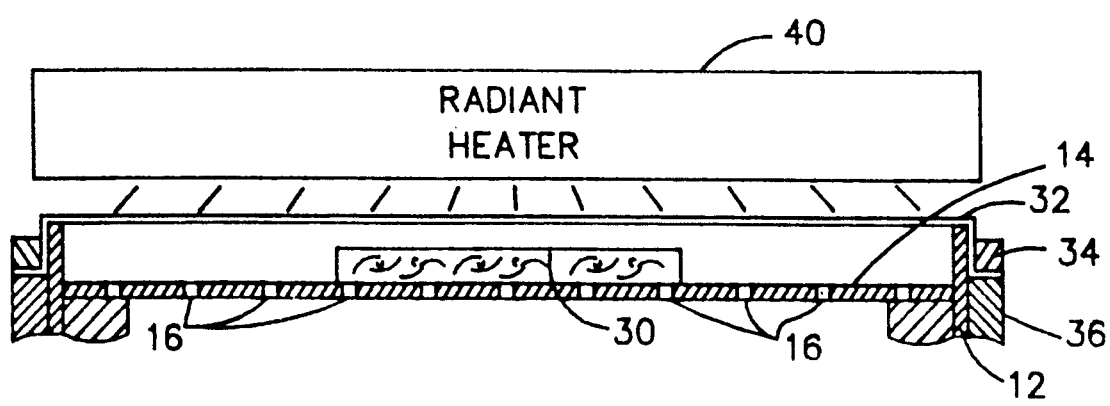
FIG. 2 illustrates the heating step.

Referring to the drawings, FIG. 1 illustrates a tool having an aluminum base 10 with an upstanding sidewall 12. The base preferably has a rectangular configuration. Sidewall 12 extends around the four sides of the base.

The base has a horizontal, planar support 14. Support 14 has a pattern of passages or openings 16. Support 14 is mounted above bottom wall 18 of the base to form vacuum chamber 20. The bottom wall has an opening 22 connected by a conduit 24 to a source of vacuum 26, such as a vacuum pump, which is operable to form a low-pressure zone in vacuum chamber 20.

Base 10 may be preheated by any suitable means, not shown. The article that is to be encased, such as a porous, fibrous fiberglass mat 30, or other porous material having good insulation and sound-deadening properties, such as a composite material of layers of fiberglass and foam, is placed on support 14 over openings 16. The fiberglass may be either a molded or a woven material.

The pattern of openings extends beyond the border of the mat.

The fiberglass mat may have any suitable thickness and configuration. For example, the mat may have a configuration accommodating a motor vehicle part on which it is to be mounted. Further, several mats can be mounted on the base and simultaneously encased. The mat may have an irregular contour, and may be seated in a cavity, not shown, having a matching contour.

A flexible, air impervious, polyethylene sheet 32, about 3 mils thick, is then mounted on the sidewalls above the mat. The sheet is mounted over the entire base.

A four-sided frame 34 is lowered on the edges of the sheet onto shoulder 36 to form an air-tight seal around the top of the base. Thus, the mat is disposed in a vacuum chamber defined by support 14, sidewall 12 and sheet 32. The sheet is preferably of the type known as an anti-static material, available from Carroll Products, Inc. of Sterling Heights, Mich.

The base, mat and sheet 32 are then placed beneath a radiant heater 40. Heater 40 is energized for about a second. The heat from both the base and the radiant heater heats sheet 32 such that it becomes somewhat molten, losing any wrinkles and becomes somewhat rounded between opposite sides of the sidewall. At this stage, the sheet becomes adhesive.

Figure 3:
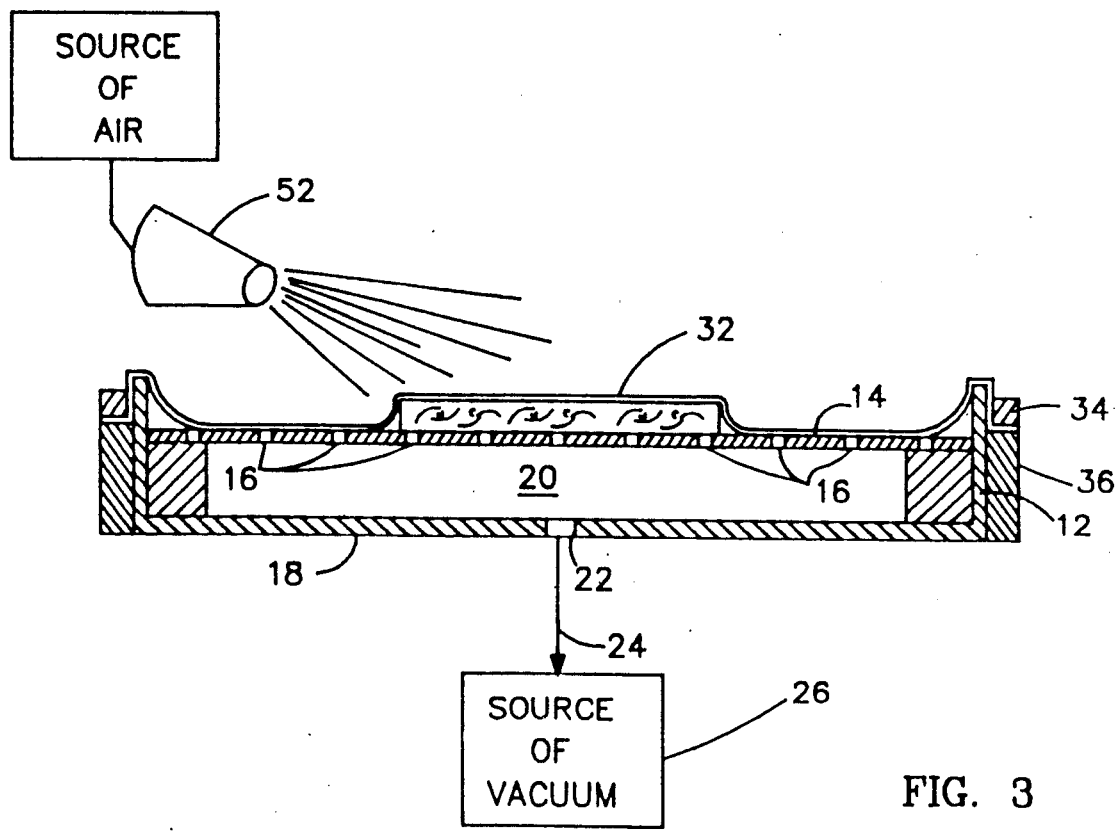
FIG. 3 illustrates the vacuum forming and cooling steps.

Referring to FIG. 3, the vacuum pump then withdraws the air from chamber 20, and through openings 16 creates a low pressure area beneath sheet 32, drawing it into intimate contact with the mat. The vacuum is applied beneath the sheet for about five seconds, until the sheet adheres to the mat and becomes embedded in the surface of the fiberglass material.

Blower means 52 then blows cool air on the sheet so that it freezes or takes a set, conforming to the configuration of the mat.

Figure 4:
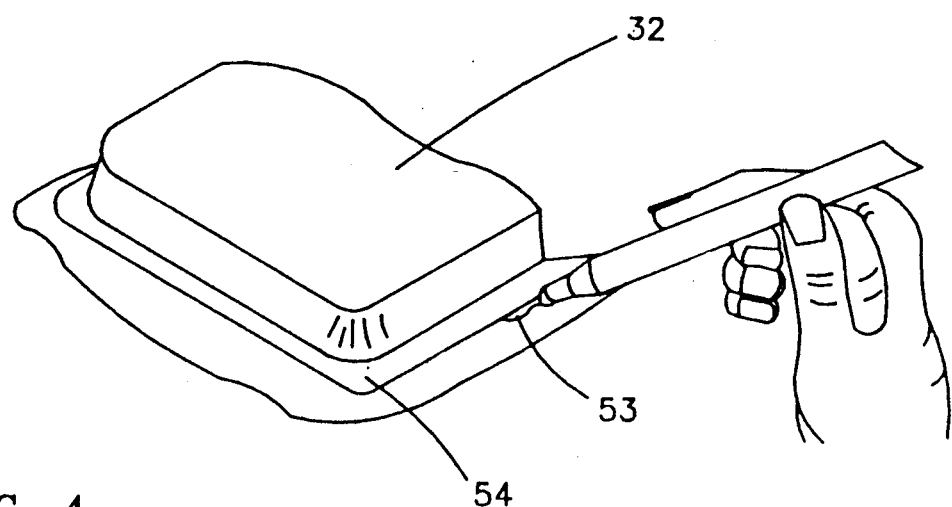
FIG. 4 illustrates the trimming step for the first plastic sheet.

Referring to FIG. 4, cutting means 53 are employed to trim the sheet to form a lip 54, about ½ inch wide, completely around the mat.

Figure 5:
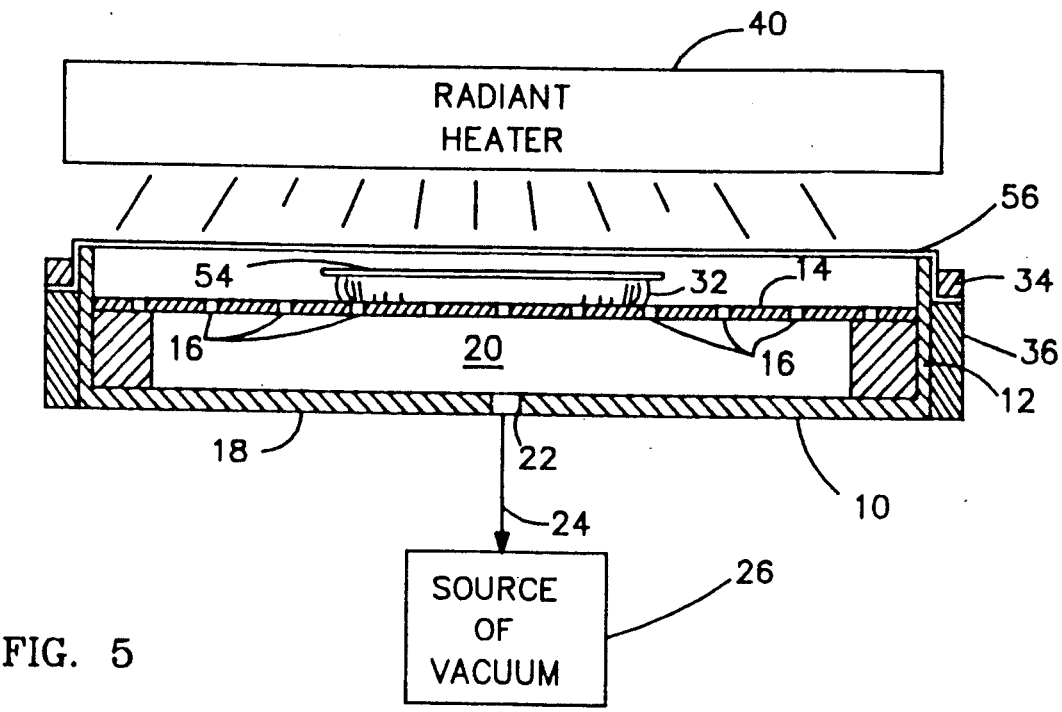
FIG. 5 illustrates the step for attaching the second sheet to the fiberglass mat.

Referring to FIG. 5, mat 30 and trimmed sheet 32 are then turned upside-down and placed on base 14.

A second sheet 56 of the same flexible plastic film as sheet 32, about 3 mils thick, is then mounted on sidewall 12 above the mat to form the top wall of a vacuum chamber for the mat.

The mat and the second sheet are then placed beneath the radiant heater.

Sheet 56 is heated until it becomes adhesive. The vacuum pump is energized to create a low pressure zone beneath sheet 56 drawing it toward both the upper, exposed surface of the mat and lip 54.

Sheet 56 then intimately contacts the mat and penetrates it to adhere to and become embedded in the fiberglass material. Sheet 56 contacts lip 54 to form a heat-sealed seam completely around the mat.

Figure 6:
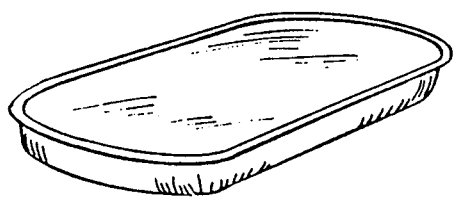
FIG. 6 is a view of a finished product.
Figure 7:
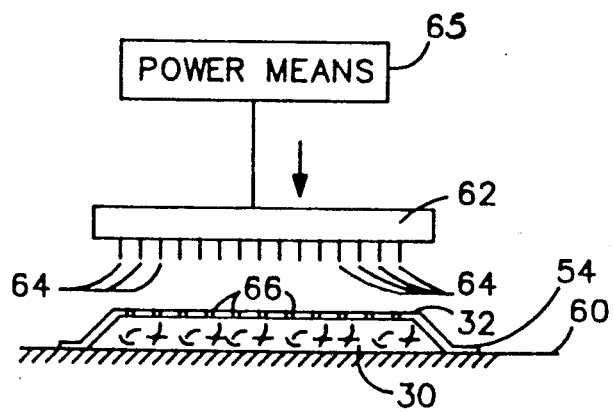
FIG. 7 illustrates the step for perforating the first plastic sheet.
Figure 8:
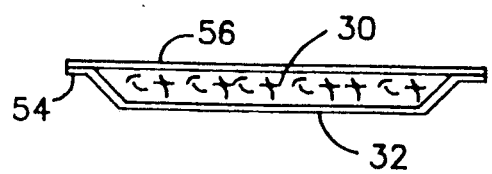
FIG. 8 is a sectional view through the finished product.
Figure 10:
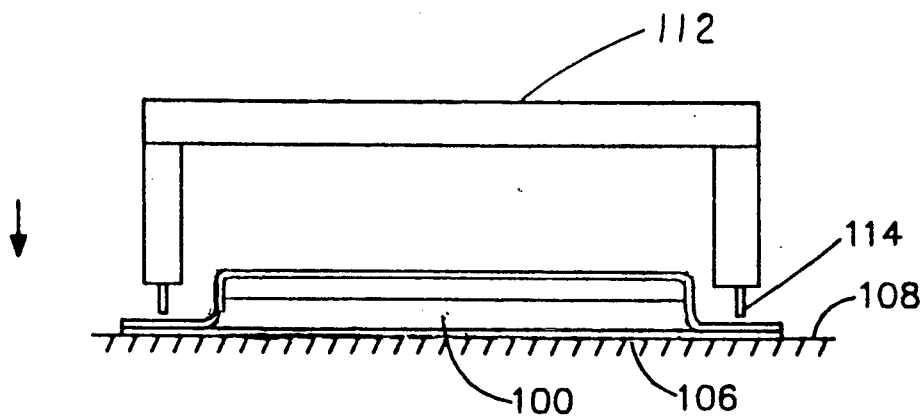
FIG. 10 is a view of the core of FIG. 9 being enclosed in an envelope formed by heat-sealing and trimming a seam entirely around the core.
Figure 13:
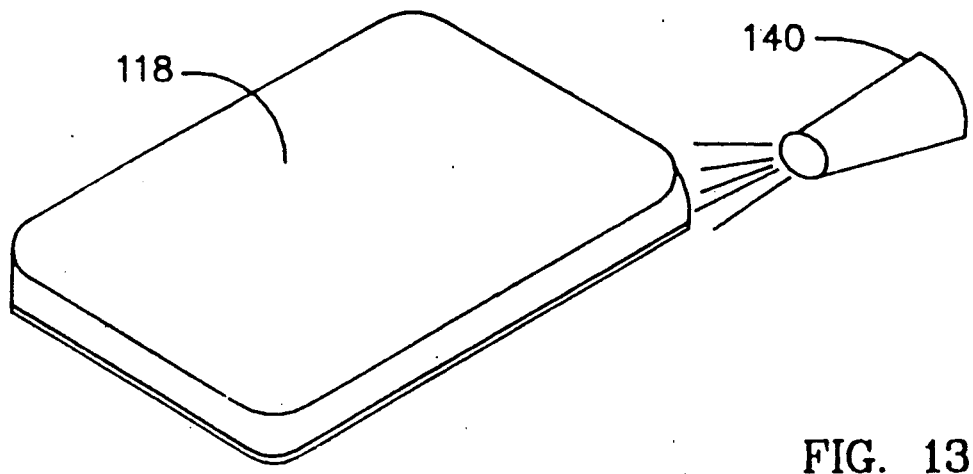
FIG. 13 is a view illustrating the finished product being cooled by a blower.

Blower means 52 blows cooling air on sheet 56 to cool and freeze it. Sheet 56 is then trimmed to form a finished product, as illustrated in FIGS. 6 and 10, in which the compressed mat is enclosed in an envelope formed by the two plastic sheets.

The finished product retains the principal insulation characteristics of the fiberglass insulation but no longer has the itchy properties of the exposed insulation.

Under some circumstances, the first sheet applied to the mat is perforated. In such a situation, mat 30 and trimmed sheet 32 are placed on a support 60 beneath a board 62 having a plurality of piercing elements 64 arranged in a suitable pattern. Power means 65 then lowers board 62 so that piercing elements 64 perforate sheet 32, forming small pin holes 66 through the sheet.

When the mat is then placed on support 14 in the step described with reference to FIG. 5, the perforated sheet 32 permits the vacuum to be applied through the porous mat to draw sheet 56 down onto the mat.

In some cases, the first sheet becomes somewhat porous as it becomes embedded in the mat, so that the piercing step is unnecessary.

FIGS. 9-13 illustrate another preferred process for forming an enclosed insulating and sound-deadening product.

Figure 9:
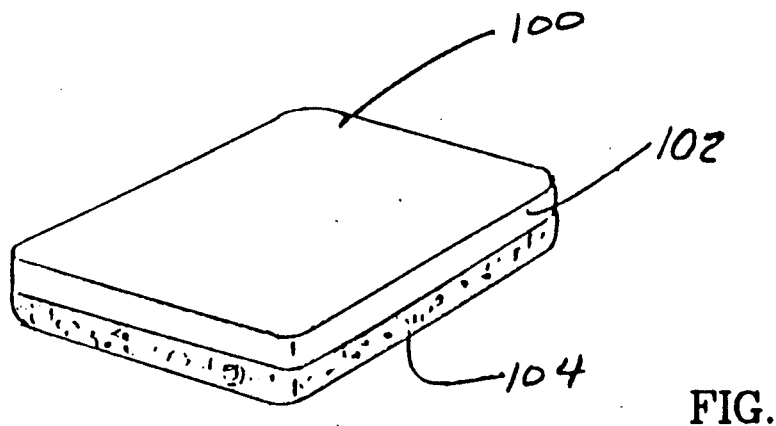
FIG. 9 is a perspective view of a composite, uncovered core.

FIG. 9 illustrates a core 100 formed of a layer of a molded, porous fiberglass mat 102 attached, as by a suitable adhesive, to a porous foam plastic material 104. The two layers have a common border. Core 100 has a generally rectangular body, but can be circular or any other suitable configuration. The thickness can also be variable or include openings to accommodate a sheet metal automotive part or the like.

Referring to FIG. 10, a sheet 106 of a polyethylene plastic material about 3 mils thick is laid on belt conveyor 108 which functions as a support. The sheet has a length and width greater than that of core 100. The core is placed on the sheet in a central position. A second sheet 110 of a polyethylene material is then placed on top of the core so that the sheet edges overlie the edges of the lower sheet.

A film heat-sealing means 112 is then lowered so that a continuous heat-sealing die 114 engages the edges of the two films to form a seam 116 extending entirely around core 100. The core is then entirely disposed in a plastic envelope 118 formed by the two heat-sealed sheets.

While the edges of the two films are sill hot, a vacuum unit (not shown) pulls away the trimmings while the die is still down.

Figure 11:
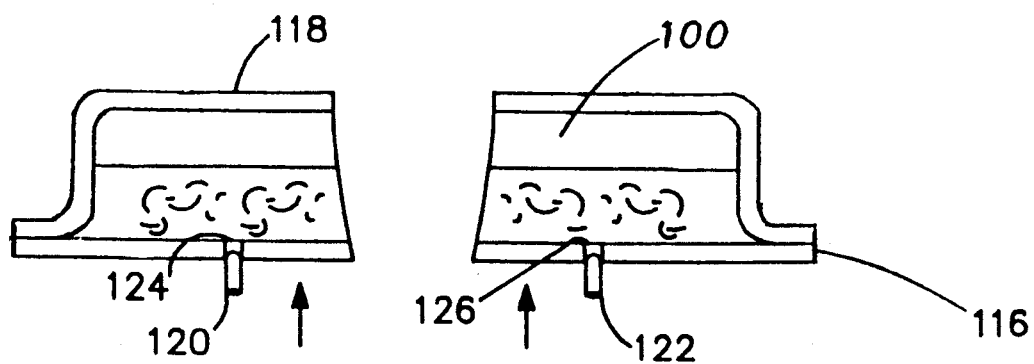
FIG. 11 is a view showing one side of the envelope being pierced.

Referring to FIG. 11, lower sheet 106 is then pierced by piercing means 120 and 122 to form a pair of openings 124 and 126, respectively, in the envelope suitable for passing air from the envelope.

Figure 12:
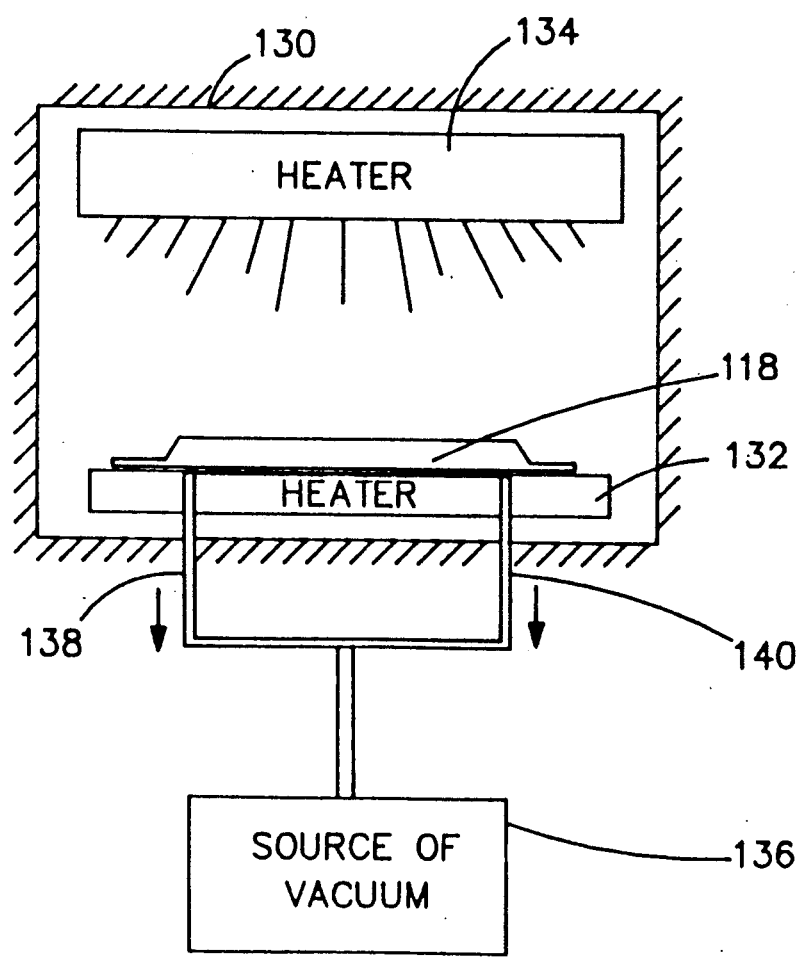
FIG. 12 illustrates the enclosed core disposed in a heating tunnel for heating the envelope while exhausting air by a vacuum source.

Referring to FIG. 12, the trimmed and pierced envelope is then placed in a heating tunnel 130 on heater 132. Envelope 118 is also beneath an upper, radiant heater 134. A source of vacuum 136 is connected by conduits 138 and 140 to the two openings 124 and 126. Upper and lower heaters 132 and 134 are adapted to simultaneously heat the entire lower and upper surfaces of the envelope as the vacuum source, such as a vacuum pump, withdraws air from within the envelope. Consequently, the core is compressed, while the two sheets forming the envelope become somewhat molten and self-adhesive. The sheets then become embedded in the entire exposed surface of the core. The envelope is basically heat-shrunk onto the core while the envelope material embeds itself in the core material.

Referring to FIG. 16, blower means 140 blows cooling air on the envelope to cool the envelope material so that it takes a set or freezes. The envelope material then is tightly attached on all sides of the core as, illustrated in FIG. 16, forming a shrink-wrapped, finished product. When the envelope material has taken a set, it maintains the porous inner core in its compressed condition.

It is to be understood that the core and the envelope can be formed with different edge and surface configurations to accommodate various components to which the product is to be attached, such as the hood of an automobile or other irregularly shaped components.

It is to be understood that generally the finished product is not usually intended to form a vacuum-sealed product since the piercing or vacuum holes may remain opened in the finished product. For most purposes, the primary object is to tightly encase a fiberglass mat in a shrink-wrapped envelope for ease in handling and for aesthetic purposes.

The preferred process is relatively inexpensive and provides a product that can be encased in a short period of time.

Having described my invention, I claim:

1. A method for enclosing an article in a plastic sheet material that becomes adhesive in the presence of heat, comprising the steps of:

disposing a first sheet of air impervious plastic material adjacent the article, the first sheet being capable of becoming adhesive when heated;

heating the first sheet such that it becomes adhesive;

drawing the first plastic sheet toward the article to become adhesively attached thereto;

cooling the first plastic sheet until it sets;

disposing a second sheet of an air impervious plastic material adjacent the article, the second sheet being capable of becoming adhesive when heated;

heating the second sheet such that it becomes adhesive; and drawing the second sheet toward the article and the first plastic sheet to become adhesively attached thereto without the use of an adhesive material other than said first and second sheets.

2. A method as defined in claim 1, including the step of trimming the second plastic sheet around the article.

3. A method as defined in claim 1, in which the article comprises a porous fiberglass mat.

4. A method as defined in claim 1, in which the first sheet forms a wall of a vacuum chamber for the article.

5. A method as defined in claim 1, in which the article is disposed on a base means, and including the step of preheating the base means before the first sheet is disposed above the article.

6. A method as defined in claim 1, in which the first sheet is a polyethylene plastic material.

7. A method as defined in claim 1, in which the heating step comprises applying radiant heat adjacent the first sheet.

8. A method as defined in claim 1, including the step of cooling the second sheet after it has become embedded in the article.

9. A method as defined in claim 1, in which the article is disposed on a base means having a pattern of air passages beneath the article, and including the step of applying an air pressure differential through said air passages.

10. A method as defined in claim 1, in which the first sheet of plastic material is suspended above the article such that it does not substantially contact the article.

11. A method as defined in claim 1, in which an air pressure differential is applied between the first sheet and the base means to draw the first sheet toward the article.

12. A method as defined in claim 1, including the step of perforating the first sheet of plastic material to form openings effective to introduce a vacuum therethrough, before the second sheet is drawn toward the article.

13. A method as defined in claim 1, in which the first sheet becomes sufficiently porous to pass air as the first sheet becomes adhesively attached to the article.

14. A method as defined in claim 1, including the step of mounting the article on a base means having a surface configuration matching the surface configuration of a portion of the article.

15. A method as defined in claim 1, in which a vacuum-operated means draws the first sheet toward the article.

16. A method for enclosing an article in a plastic sheet material that becomes adhesive in the presence of heat, comprising the steps of:

disposing a first sheet of air impervious plastic material adjacent the article, the first sheet being capable of becoming adhesive when heated;

heating the first sheet such that it becomes adhesive;

drawing the first plastic sheet toward the article to become adhesively attached thereto;

cooling the first plastic sheet until it sets;

disposing a second sheet of an air impervious plastic material adjacent the article, the second sheet being capable of becoming adhesive when heated;

heating the second sheet such that it becomes adhesive;

drawing the second sheet toward both the article and at least a portion of the first plastic sheet overlapping the article to become adhesively attached thereto;

cooling the second plastic sheet until it sets;

whereby the article is encased between the first and second sheets.

17. A method for making an article of manufacture comprising the steps of:

providing a porous body having good sound-deadening and insulation properties;

disposing the porous body in an envelope of a sheet plastic material having first and second sheet sections;

heat sealing the first and second sheet sections of the envelope to form a seam around the body to fully enclose the porous body therein;

forming opening means in said envelope;

heating the envelope and exhausting air from the envelope through said opening means until the heated plastic material becomes embedded in the surface of the porous body;

whereby the article retains at least a portion of the sound-deadening and insulation properties of the porous body.

18. A method as defined in claim 17, in which the first and second sheet sections are heat sealed together before the plastic material is embedded in the surface of the porous body.

19. A method as defined in claim 17, in which the porous body comprises a fiberglass mat.

20. A method as defined in claim 17, in which the body comprises a composite material which includes fiberglass and a foam material.

21. A method as defined in claim 17, including the step of compressing the porous body as the air is being exhausted from the envelope.

22. A method as defined in claim 17, including the step of disposing the porous body between a pair of air impervious plastic sheets.

23. A method as defined in claim 17, in which the porous body comprises a composite material which includes a fiberglass mat.

24. A method as defined in claim 17, in which the porous body comprises a fiberglass mat adhered to a foam mat.

25. A method as defined in claim 17, including the step in which the envelope is heated sufficiently to shrink on to the porous body and to become embedded in the surface thereof.

26. A method as defined in claim 17, in which the first and second sheet sections are heat sealed together to form a seam around the porous body.

27. A method as defined in claim 26, including the step of trimming the seam simultaneously with the heat-sealing step.

28. A method as defined in claim 17, in which both sides of the envelope are heated simultaneously on opposite sides of the porous body while a vacuum is applied to one side thereof.

* * * * *